United States Patent [19]

Clough

[11] Patent Number: 5,198,929
[45] Date of Patent: Mar. 30, 1993

[54] FLEXIBLE SEAL FOR ADJUSTABLE SIDE VIEW MIRROR

[75] Inventor: Eric M. Clough, Birmingham, Mich.

[73] Assignee: General Motors Corporation, Detroit, Mich.

[21] Appl. No.: 912,373

[22] Filed: Jul. 13, 1992

[51] Int. Cl.$^5$ .................... G03B 11/04; G02B 7/182
[52] U.S. Cl. .................... 359/513; 359/507; 359/872
[58] Field of Search .................. 359/507–509, 359/511–514, 600, 606, 611–612, 838, 842–844, 871–874, 879–881; 248/682, 683, 548, 549, 466, 467, 900

[56] References Cited

U.S. PATENT DOCUMENTS

| | | | |
|---|---|---|---|
| 3,609,014 | 9/1971 | Kurz, Jr. | 359/874 |
| 4,571,027 | 2/1986 | Klein | 359/606 |
| 4,989,966 | 2/1991 | Kim | 359/872 |
| 5,056,903 | 10/1991 | Nakamura et al. | 359/513 |

Primary Examiner—Bruce Y. Arnold
Assistant Examiner—Thong Nguyen
Attorney, Agent, or Firm—William A. Schuetz

[57] ABSTRACT

An adjustable side view mirror that utilizes a flexible seal between a mirror and a headshell of the adjustable side view mirror so as to eliminate wind noise created by the clearance between the mirror and the headshell of a conventional adjustable side view mirror. The flexible seal allows the mirror to be mounted outside the headshell which allows for a reduction in the size of the headshell, therefore creating less wind resistance when traveling, which in turn leads to a greater efficiency of the vehicle. The flexible seal prevents moisture and contamination from entering the headshell and possibly damaging a power pack for adjusting the mirror.

8 Claims, 2 Drawing Sheets

FLEXIBLE SEAL FOR ADJUSTABLE SIDE VIEW MIRROR

The present invention relates, in general, to adjustable side view mirrors utilized on the outside of vehicles, and more particularly, to a flexible seal that eliminates the gap created between the mirror and the headshell of the adjustable side view mirror while still allowing for full range adjustment of the mirror.

BACKGROUND OF THE INVENTION

In general, almost all adjustable side view mirrors located on the outside of passenger vehicles, that are adjusted from inside the vehicle, comprise a hollow headshell that houses a mirror by which the operator of the vehicle can view the area adjacent to and behind the rearward side of the vehicle. The headshell typically houses the means by which the side view mirror is adjusted, such as an electrical power pack, which is controlled by an operator inside the vehicle. The mirror is connected to the power pack in such a way that the angle of the mirror may be adjusted to a wide range of viewing angles. The headshell typically extends over or beyond the mirror to protect the mirror from damage. Since the mirror has a range of angles by which it can be adjusted relative to the opening in the headshell, a clearance gap is provided between the headshell and the mirror to ensure a non-interference condition in all mirror positions. This gap provided between the headshell and the mirror creates wind noise when the vehicle is traveling, thereby creating an annoying disturbance to passengers of the vehicle.

The clearance gap also requires the design of a larger headshell than a headshell without such a gap, especially when a conventional electrochromic feature is added around the perimeter of the mirror. The electrochromic feature is an automatic tinting of the mirror upon sensing direct light in the mirror such as light from a following vehicle's headlamps. The need for a larger headshell creates more wind resistance when the vehicle is traveling, and therefore, the vehicle's efficiency is reduced when traveling. Also, the gap allows for moisture and contaminants to access the means by which the mirror is adjusted. Since this means of adjusting is typically an electrical power pack, the allowance of moisture and contaminants may lead to the malfunctioning of the power pack.

SUMMARY OF THE INVENTION

The present invention solves the above mentioned problems by providing a flexible seal between the mirror and the headshell of the adjustable side view mirror. The flexible seal is connected to both the periphery of the mirror and the outer edge of the open end of the headshell thereby eliminating the clearance gap between the mirror and the headshell. The flexibility of the seal is provided by a bellows fold in the flexible seal which allows the flexible seal to move with the mirror during angular adjustment. This allows the mirror to be adjusted to any angle while still eliminating the gap between the mirror and the headshell. By eliminating the clearance gap, the wind noise created by the clearance gap is eliminated. Also, by utilizing a flexible seal, the headshell need not and does not extend over or beyond the mirror, but rather the flexible seal acts as an extension or bezel of the headshell. The mirror is horizontally spaced from the open end of the headshell, as the mirror is mounted in the foregound of the open end of the headshell. This allows the headshell to be smaller in height and width than the conventional headshell previously described, and therefore, less wind resistance is created, thereby increasing the efficiency of the vehicle when traveling. Also, by sealing off the gap, a closure is created in the headshell, and the electrical power pack mounted inside the headshell is protected from moisture and contaminants, thereby eliminating the risk of malfunctioning caused by such attributes.

The idea of providing a flexible member between the headshell and the mirror of an adjustable side view mirror is not new, as disclosed in the U.S. Pat. No. 4,989,966 to Kim. The Kim '966 patent discloses a flexible member between the headshell and the mirror of an adjustable side view mirror which is utilized as an adjustment means by which the angle of the mirror is adjusted. The headshell extends over and beyond the periphery of the mirror, and therefore, the size of the headshell is not reduced by the addition of the flexible member.

To this end, the objects of the present invention are to provide a new and improved adjustable side view mirror having a seal that prohibits the creation of wind noise caused by the otherwise clearance gap between the periphery of the mirror and the headshell; to provide a new and improved adjustable side view mirror that provides a headshell substantially the same size as the periphery of the mirror so as to increase the efficiency of the vehicle when in motion; and to provide a new and improved adjustable side view mirror that provides an enclosure in the headshell so as to protect the means for adjusting the side view mirror from moisture and contaminants.

DESCRIPTION OF THE PREFERRED EMBODIMENT

Figure 1:
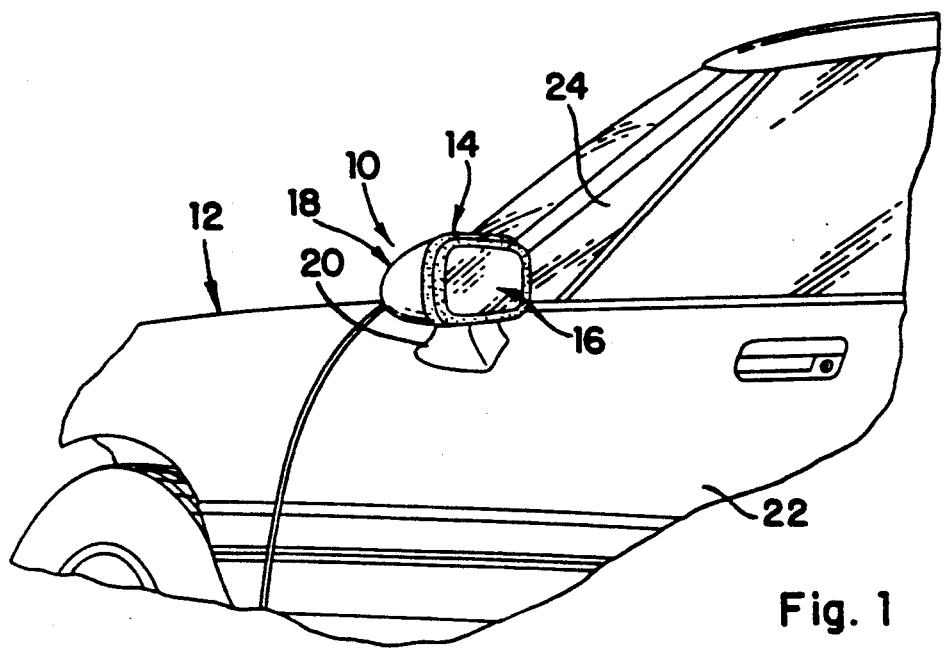
FIG. 1 is a perspective view of the adjustable side view mirror made according to the present invention and shown mounted in its typical application on a vehicle.

Referring to the drawings, the present invention will now be described in detail with reference to the preferred embodiment.

FIG. 1 is a perspective view of an adjustable side view mirror or mirror assembly (10) mounted to the outside of a vehicle (12) and utilizing a flexible seal (14) between a mirror (16) and a headshell (18). The adjustable side view mirror (10) is typically mounted to a support (20) which in turn is mounted to the outside of the vehicle (12), such as a door (22) (as mounted in FIG. 1) or a window patch (24). The adjustable side view mirror (10) typically houses a means by which to adjust the angle of the mirror (16) so that the operator (now shown) of the vehicle (12) can adjust the mirror (16) from inside the vehicle (12).

Figure 2:
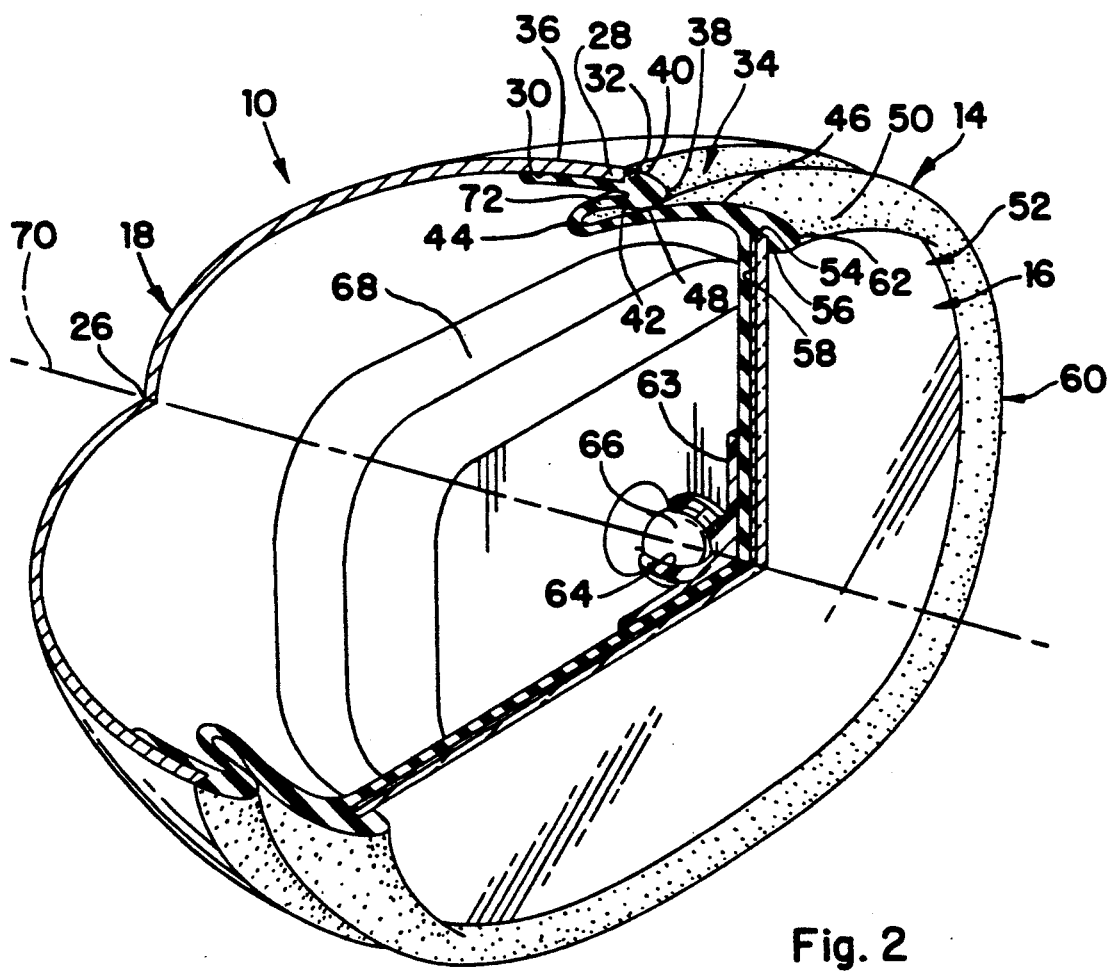
FIG. 2 is a perspective view having parts broken away and in section showing the internal configuration of the present invention.

As seen in FIG. 2, the adjustable side view mirror (10) comprises the headshell (18) which is semi-elliptical in shape with a hollow interior. A closed end (26) of the headshell (18), or the rounded end of the semi-elliptical shape, is disposed so as to face toward the front of the vehicle (12). An open end (28) of the headshell (18), or the oval end of the semi-elliptical shape, is disposed so as to face toward the rear of the vehicle (12), thus allowing the operator of the vehicle (12) to view the area adjacent to and behind the rearward side of the vehicle (12) from inside the vehicle (12). The flexible seal (14) is adhered to an inside surface (30) of the open end (28) of the headshell (18) through the use of a conventional adhesive (not shown). The flexible seal (14) extends outwardly from the inside surface (30) of the open end (28) of the headshell (18) and continues to cover a side surface (32) of the open end (28) of the headshell (18). The flexible seal (14) is also adhered to the side surface (32) by way of a conventional adhesive (not shown). The side surface (32) of the open end (28) of the headshell (18) is substantially perpendicular from the inside surface (30) of the open end (28) of the headshell (18). The flexible seal (14) acts as a first bezel (34) to the open end (28) of the headshell (18) as it extends outward and is flush or substantially flush with the outside surface (36) of the headshell (18). The first bezel (34) has a U-shaped cross-section wherein the closed end (38) of the U-shape extends outward away from the headshell (18). The top side (40) of the U-shaped cross-section is substantially flush and continuous with the outside surface (36) of the headshell (18), while the bottom side (42) of the U-shaped cross-section leads the inwardly extending portion of the flexible seal (14).

From where the flexible seal (14) is connected to the headshell (18), the flexible seal (14) extends inwardly and rearwardly from the first bezel (34) into the headshell (18). The flexible seal (14) then reversely folds into a single bellows fold (44) which allows the flexible seal (14) to extend outwardly away from the headshell (18). An outwardly extending portion (46) of the flexible seal (14) is substantially flush and in contact with the underside (48) of the first bezel (34). Continuous with the outwardly extending portion (46) of the flexible seal (14) is an outward end (50) which is attached to the mirror (16). The mirror (16) is substantially the same height and width as the open end (28) of the headshell (18). The outward end (50) surrounds a periphery (52) of the mirror (16) which comprises a circumferential edge (54) of the mirror (16) and an outer edge portion of a front side (56) and a back side (58) of the mirror (16) which are both substantially perpendicular from the circumferential edge (54). The flexible seal (14) extends radially inward from the outward end (50) surrounding the periphery (52) of the mirror (16) to cover the entire back side (58) of the mirror (16). The outward end (50) provides a second bezel (60) extending outward, away from the mirror (16) and the headshell (16). The second bezel (60) also has a the mirror (16). The second bezel (60) also has a U-shaped cross-section with the closed end (62) of the U-shape extending outward away from the headshell (18) and mirror (16).

The portion of the flexible seal (14) that comprises the bellows fold (44) is thinner in cross-sectional width than the portion of the flexible seal (14) that comprises the outward end (50) or second bezel (60) of the mirror (16) and the portion forming the first bezel (34) of the headshell (18). The flexible seal (14) portion comprising the bellows fold (44) must be thin enough to allow the bellows fold (44) to expand or contract while ensuring a non-interference condition with the mirror (16) during adjustment of the mirror (16). In the preferred embodiment, the flexible seal (14) is molded onto the periphery (52) and the backside (58) of the mirror (16). In another embodiment, the flexible seal (14) is adhered to the periphery (52) and the backside (58) of the mirror (16) through the use of a conventional adhesive. In either of the aforementioned embodiments, the flexible seal (14) need not cover the entire back side (58) of the mirror (16), but rather only a portion thereof or only the periphery (52) of the mirror (16).

The flexible seal (14) is made of a flexible material which resist the penetration of moisture and contaminants, preferably a thermoplastic elastomer sold under the trademark Monsanto's Santomprene. This ensures that no moisture or contaminants will infiltrate and damage the adjustment means for the mirror (16).

A conventional ball and socket arrangement is utilized as an adjustment means and a mounting means for the mirror (16). A bracket (63), with a socket (64) attached, is mounted on the backside (58) of the mirror (16). The socket (64) receives a ball (66) which is mounted to a suitable or conventional electrical power pack (68). The power pack (68) is mounted inside the headshell (18) and has its electrical wiring (not shown) extending through the adjustable side view mirror support (20) and into the vehicle (12). The ball (66) and socket (64) mechanism allows for a wide range of viewing angles of the mirror (16). The power pack (68) allows for the electrically powered adjustment of the mirror (16) through a simple control switch (not shown) located in the interior of the vehicle (12).

As a mounting means, the ball (66) and socket (64) mechanism allows for the mirror (16) to be mounted outside the headshell (18) in the foreground of the headshell's open end (28). The mirror (16) is mounted so as to share a common horizontal center-line axis (70) with the headshell (18), thereby creating a horizontal distance between the mirror (16) and the headshell (18) along the horizontal center-line axis (70). This allows the open end (28) of the headshell (18) to be substantially the same size as the periphery (52) of the mirror (16) thereby providing a reduction in the size of the headshell (18) as compared to conventional headshells. By reducing the size of the headshell (18), wind resistance is reduced, and efficiency of the vehicle (12) is increased.

Figure 3:
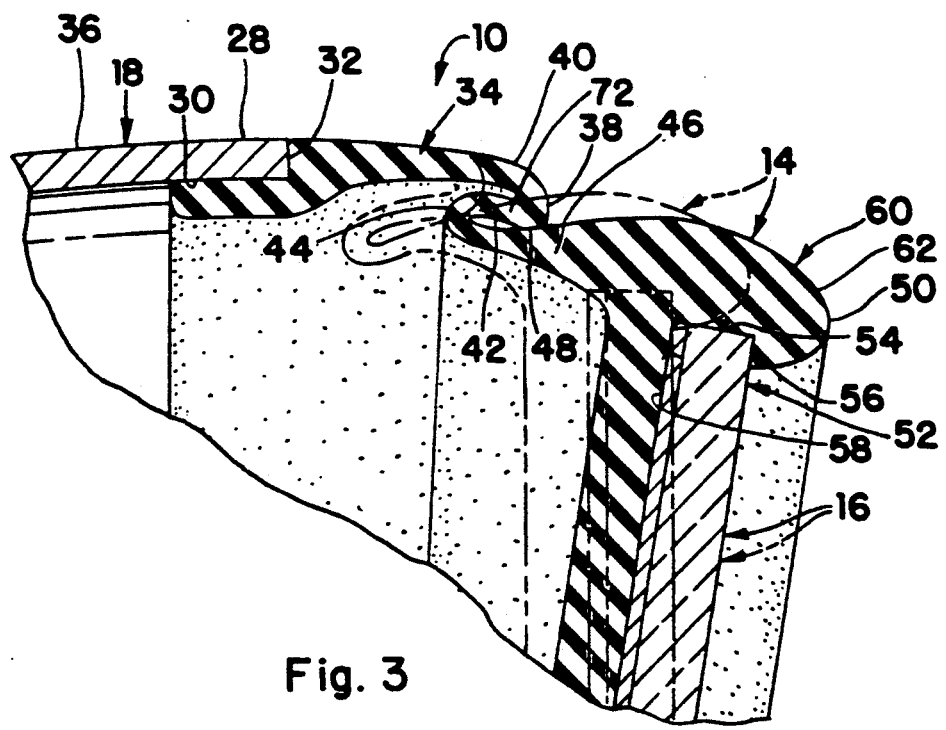
FIG. 3 is a cross-sectional view of a portion of the present invention showing the mirror and the flexible seal in their most extended positions of adjustment.
Figure 4:
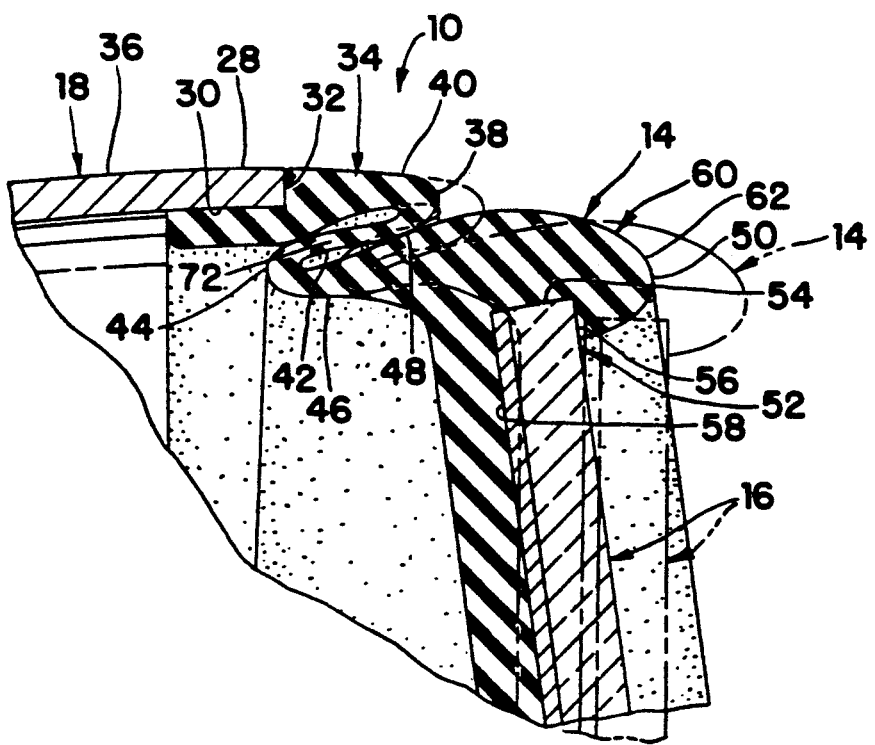
FIG. 4 is a cross-sectional view of a portion of the present invention showing the mirror and the flexible seal in their most retracted positions of adjustment.

As seen in FIG. 3 and 4, the flexible seal (14) has the ability to flex and maintain the seal between the mirror (16) and the headshell (18) when the mirror (16) is adjusted to its extreme positions. As seen in FIG. 3, when the mirror (16) is adjusted so that a portion of the periphery (52) of the mirror (16) is extended to its maximum outward position, the bellows fold (44) provides the necessary amount of flexible seal material (14) to extend with the mirror (16), thus maintaining the seal between the mirror (16) and the headshell (18). In the preferred embodiment, a sufficient amount of flexible seal (14) material is provided to insure that the bellows fold (44) remains in a closed, folded position at all positions, even when the periphery (52) of the mirror (16) is in its maximum outward position. In other words, the inwardly extending portion (72) of the first bezel (34) of the flexible seal (14) always remains in contact with the outwardly extending portion (46) of the flexible seal (14) so as not to form a gap in the bellows fold (44). This will ensure that no wind noise will be created by an opening in the bellows fold (44). As seen in FIG. 4, when the mirror (16) is adjusted so that a portion of the periphery (52) of the mirror (16) retracts to its maximum inward position, the bellows fold (44) becomes larger as it receives more flexible seal material (14) while still maintaining the seal between the mirror (16) and the headshell (18). Again, the bellows fold (44) remains in a closed, folded position.

The foregoing description is of a preferred embodiment of the invention, and it will be understood by those of ordinary skill in the art that various modifications and changes may be made without departing from the scope of the inventions defined in the claims.

The embodiments of the invention in which an exclusive property right or privilege is claimed are defined as follows:

1. An adjustable side view mirror for use on the outside of a vehicle comprising:
    a headshell being supported by said vehicle and having a center-line horizontal axis and an open end and a closed end;
    a mirror having a periphery and being of substantially a same height and width as said open end of said headshell and being adjustable to various viewing angles;
    a means for adjusting said viewing angles of said mirror;
    a means for mounting said mirror along said center-line horizontal axis so as to be outside said headshell and in the foreground of said open end of said headshell thereby providing a distance along said center-line horizontal axis between said mirror and said open end of said headshell;
    a flexible seal sealing said periphery of said mirror to said headshell, and said flexible seal having the flexibility to maintain said seal during all of said viewing angles of said mirror;
    a first means for connecting said flexible seal to said periphery of said mirror; and
    a second means for connecting said flexible seal to said headshell.

2. An adjustable side view mirror for use on the outside of a vehicle as stated in claim 1 wherein said means for connecting said flexible seal to said periphery of said mirror comprises molding said flexible seal onto said periphery of said mirror.

3. An adjustable side view mirror for use on the outside of a vehicle as stated in claim 1 wherein said means for connecting said flexible seal to said periphery of said mirror comprises adhering said flexible seal to said periphery of said mirror through the use of an adhesive.

4. An adjustable side view mirror for use on the outside of a vehicle as stated in claim 1 wherein said second means for connecting said flexible seal to said headshell comprises adhering said flexible seal to said headshell through the use of an adhesive.

5. An adjustable side view mirror for use on the outside of a vehicle as stated in claim 1 wherein said flexible seal comprises a thermoplastic elastomer.

6. An adjustable side view mirror for use on the outside of a vehicle as stated in claim 1 wherein said flexible seal has opposite ends and including a bellow fold intermediate said opposite ends and having an outer surface which is substantially flush with said headshell.

7. An adjustable side view mirror for use on the outside of a vehicle as stated in claim 6 wherein said flexible seal has opposite ends and a continuous seal intermediate said opposite ends whereby said intermediate continuous seal is narrower in width than said opposite ends allowing said continuous seal to fold during adjustment of said mirror without interference, and said continuous seal having enough flexible seal material to ensure said bellow fold stays closed in all of said adjustments of said mirror.

8. An adjustable side view mirror for use on the outside of a vehicle as stated in claim 1 wherein said means for mounting comprises:
    said mirror having a back side and a front side;
    a bracket attached to said back side of said mirror and having a socket integral with and extending inward toward said closed end of said headshell;
    a ball being received by said socket; and
    a power pack mounted to said headshell and having said ball mounted to said power pack.

* * * * *